Oct. 30, 1956  J. M. SHELNUTT  2,768,488
METHOD AND APPARATUS FOR MAKING ELECTRODELESS
GASEOUS DISCHARGE LETTERS
Filed Sept. 2, 1953  3 Sheets-Sheet 1

INVENTOR
John M. Shelnutt
BY Bacon & Thomas
ATTORNEYS

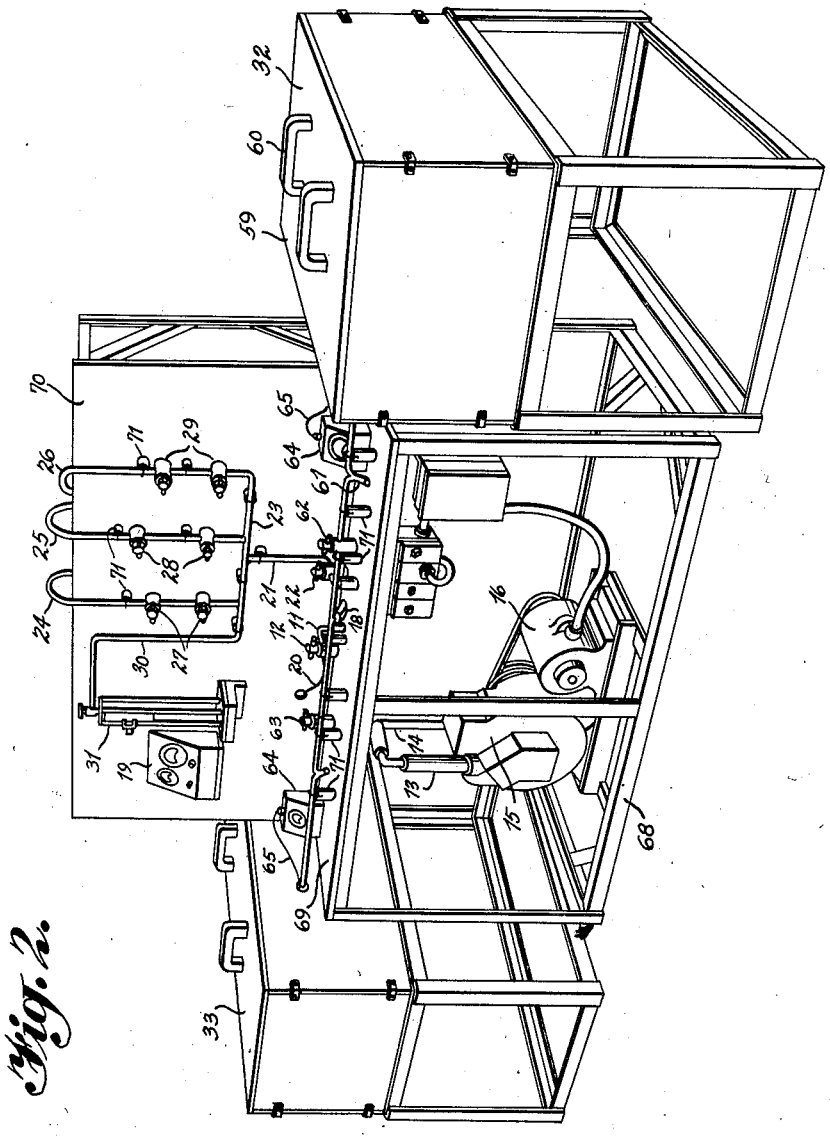

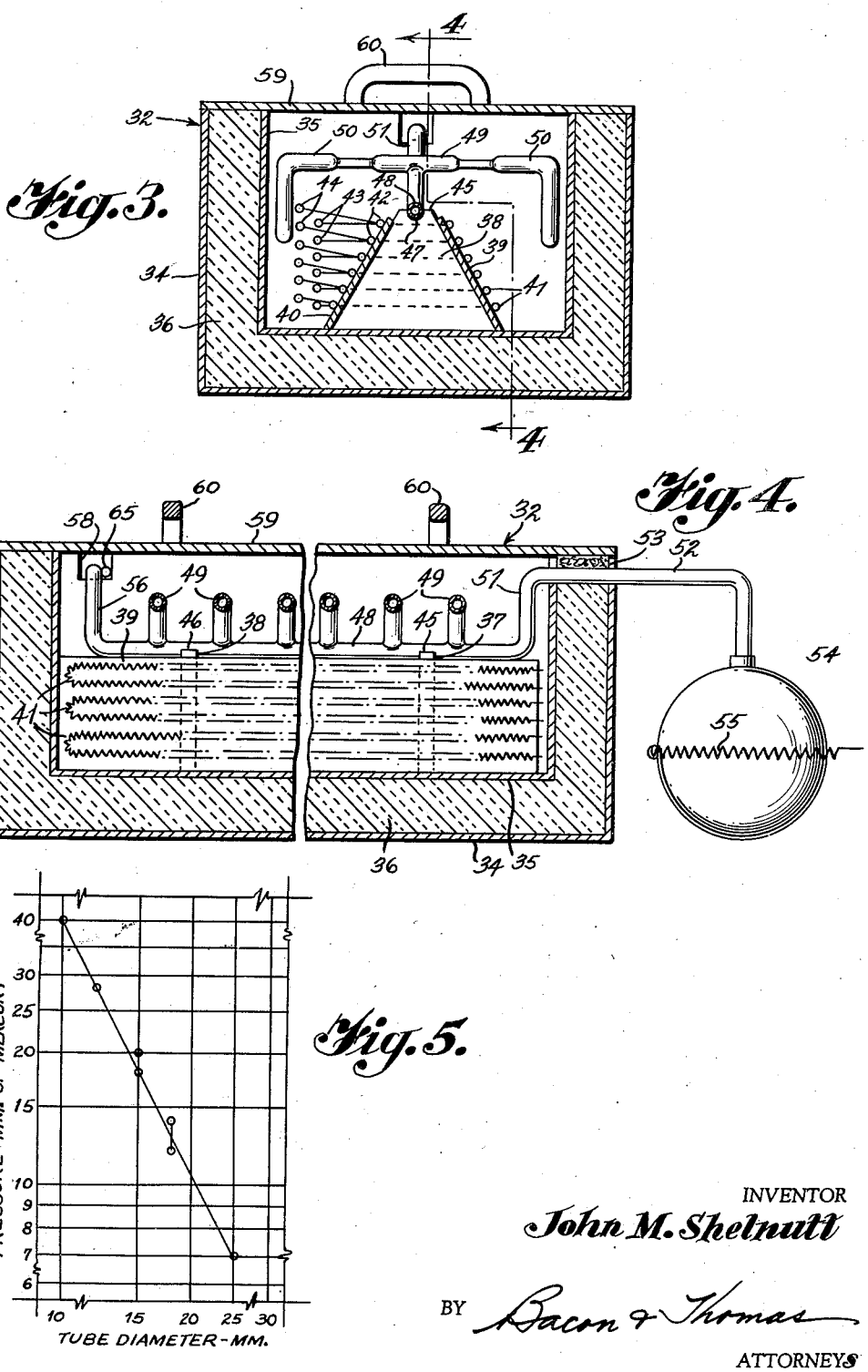

United States Patent Office 2,768,488
Patented Oct. 30, 1956

2,768,488

METHOD AND APPARATUS FOR MAKING ELECTRODELESS GASEOUS DISCHARGE LETTERS

John M. Shelnutt, San Antonio, Tex., assignor to A. C. White, Bexar County, Tex.

Application September 2, 1953, Serial No. 378,147

7 Claims. (Cl. 53—12)

This invention relates to gaseous discharge tubes and more particularly to a method and apparatus for manufacturing gaseous discharge tubes of the electrodeless type.

In the manufacture of gaseous discharge tubes it has been the customary practice to manually connect a single display letter to a vacuum manifold, to evacuate the manifold and letter, inject the desired gas, insert the desired amount of mercury vapor, and then to seal the letter and remove it from the vacuum manifold, all of the foregoing operations being performed by hand. Attempts have been made to connect a plurality of discharge tube letters to the vacuum manifold so as to make possible the simultaneous production of a number of letters, but such methods of operation have heretofore been limited by operating techniques and pressures used to the production of a relatively small number of letters so that the process remained relatively costly. The large bulk of gaseous discharge tubes manufactured today are of the type containing electrodes and attempts at manufacturing electrodeless tubes have resulted in the production of tubes having a relatively short life.

It is accordingly an object of this invention to provide a method of simultaneously producing a large number of electrodeless gaseous discharge letters.

It is another object of the invention to provide suitable apparatus for carrying out the foregoing process.

It is another object of the invention to produce electrodeless gaseous discharge tubes which will have a long service life.

According to the method of this invention a large number of gaseous discharge letters is connected to a letter manifold which in turn is connected to a source of mercury, a vacuum manifold, and a source of inert gases. The letter manifold is mounted in an oven capable of being heated to a high temperature and suitable high vacuum producing pumps are provided for connection to the vacuum manifold. The invention contemplates the connection to the vacuum manifold of a number of such ovens and letter manifolds so that an almost unlimited number of letters may be processed during a single operation. The processing procedure comprises mounting the letters on the letter manifold and placing and sealing the manifold in the oven, creating the necessary vacuum by means of the vacuum pumps and simultaneously heating the oven and the letters and letter manifold therein. The vacuum producing equipment is thereupon isolated from the letter manifold and the heat is turned off. The desired inert gases are then admitted into the letters under carefully controlled pressures and the source of gases is then closed off from the letter manifold. Mercury vapor is introduced into the letter manifold while it is still hot enough to vaporize the mercury after the latter has cooled sufficiently to allow the mercury to condense the letter manifold is sealed off from the vacuum system and the letters are removed. The use of the proper vacuum and gas pressures is of the utmost importance in obtaining optimum letter life and satisfactory multiple letter production and variation from these pressures will result in the production of letters having unsatisfactory service life.

Further advantages and features of the invention will become clear upon reference to the following specification and drawings wherein:

Figure 1 diagrammatically illustrates the entire letter processing apparatus;

Figure 2 shows a suitable table on which the vacuum and gas system may be mounted;

Figure 3 is a cross-sectional view of one of the ovens taken on the line 3—3 in Figure 1;

Figure 4 is a perspective view of one of the ovens; and

Figure 5 is a graph showing the relationship of gas pressures to tube diameters.

Figure 1:
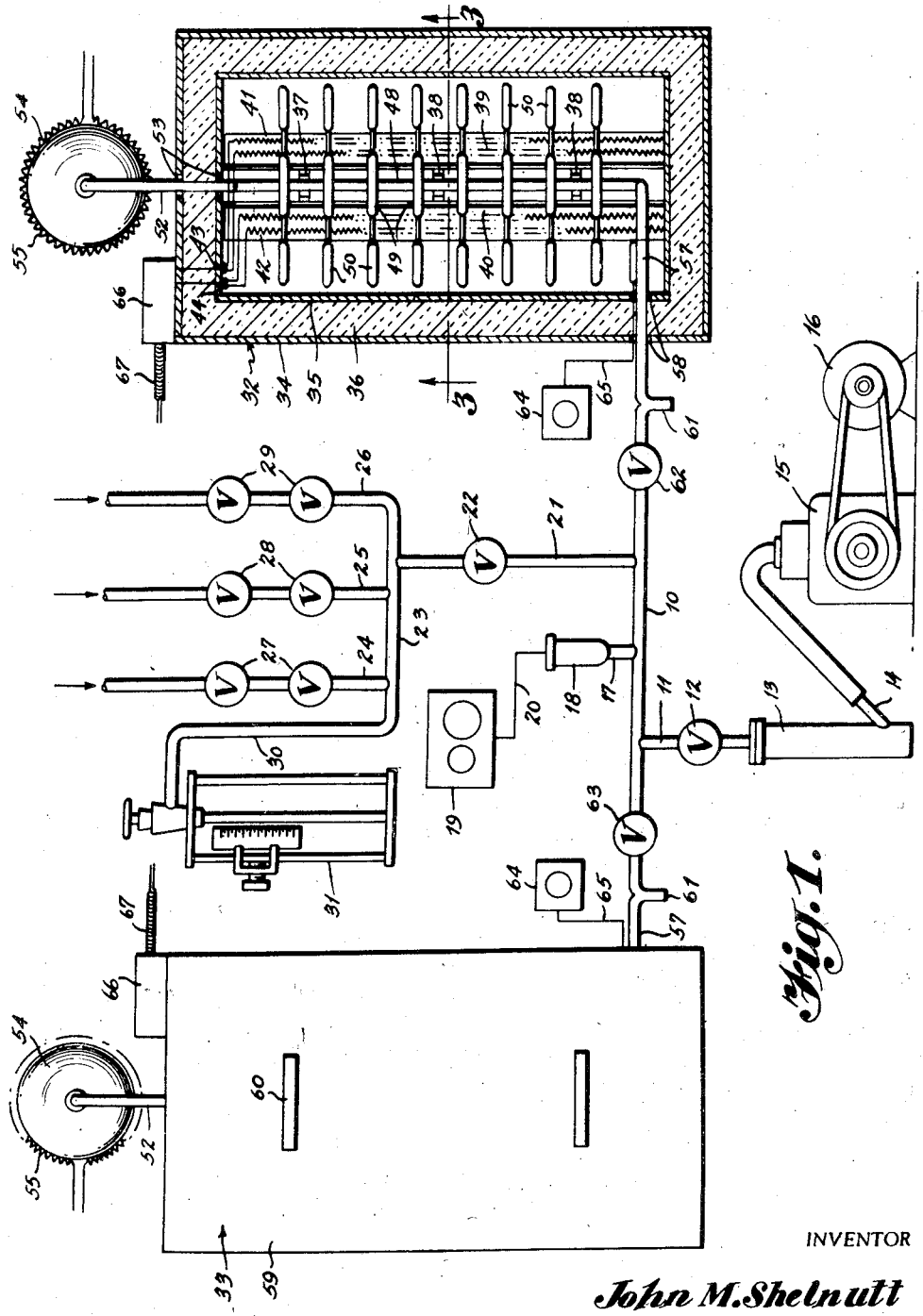

Referring more particularly to the drawing, there is shown in Figure 1 apparatus for carrying out the process of this invention. This apparatus comprises a vacuum manifold 10 which is connected by means of a tube 11 and stop cock 12 to the suction connection of a diffusion type pump 13 which may be of the butyl thyalate aspirator type. Connected to the discharge connection 14 of such diffusion pump is a backing pump 15 which may be of the motor driven type driven by the motor 16. Connected to the vacuum manifold 10 by means of a connection 17 is the sensitive element 18 of a Pirani type vacuum gauge 19. The Pirani gauge 19 may be connected to its sensitive element 18 by means of a connecting cable 20. The Pirani gauge is of the conventional type for continuously indicating the vacuum in the vacuum manifold and depends for its operation on the variation with pressure of the amount of heat conducted by the gas in the manifold across the space between a heated wire and walls of the sensitive element. The rate of heat transfer determines the temperature and therefore the resistance of the wire.

Connected to the vacuum manifold is a tube 21 containing a stop cock 22 which is connected to the inert gas manifold 23. The manifold 23 has connected thereto a plurality of tubes 24, 25 and 26 which make connection with suitable sources of inert gas, not shown. Interposed in the tubes 24, 25 and 26 are pairs of stop cocks 27, 28 and 29 for isolating the individual inert gases from the gas manifold. Connected to the left end of the gas manifold 23 by means of a tube 30 is a vacuum gauge 31 which may be of the Dubrovin type for measuring the gas pressure.

The particular system shown in Figure 1 involves the use of two ovens although it will be appreciated that a larger number may be used if so desired. The two ovens 32 and 33 each comprise an outer shell 34 and an inner shell 35 of heat resistant material having an insulating material such as crushed asbestos fiber 36 packed therebetween. Along the center line of the inner shell 35 may be located a plurality of triangular supports 37 and 38 to which are fastened inclined walls 39 and 40. Attached to the walls 39 and 40 are a plurality of resistance wire heating elements 41 and 42 having terminal connections 43 and 44 at the rear end of the inner shell 35. The triangular support members 37 and 38 are provided at their upper edges 45 and 46 with semicircular notches 47 for receiving the main tube 48 of the letter manifold. Attached to main tube 48 at regular intervals therealong are a plurality of T tubes 49 which may have letters 50 welded to their outer extremities. The main tube 48 has at its rearward end a vertical offset portion 51 and a rearward extension 52 which passes through a slot 53 in the rear inner and outer shells 35 and 34 of the oven. Connected to such rearward extension 52 is a mercury reservoir 54 which may be heated by any suitable means such as by resistance element 55. The main tube also has at its forward end a second offset portion 56 and a connection tube 57 which passes through a slot 58 in the side wall of the oven. A suitable lid such as the cover 59 having a handle 60 may be provided for closing the oven. The connection tube 57 is connected to the vacuum manifold 10 by means of the connection 61 and may be isolated therefrom by means of the stop cock 62. A temperature indicating instrument 64 of the thermocouple type having a lead 65 may be provided for indicating the temperature in the oven. Suitable connections and switches for connecting and controlling the number of heating elements which are to be energized may be provided at 66 and such connection box may be supplied with power by means of a cable 67.

The entire gas manifold and vacuum manifold along with the indicating gauges and vacuum pumps may be conveniently mounted on a table 68 having a table top section 69 and panel section 70, both of which may be of asbestos rock or similar material. The table may be conveniently of a skeletal angle iron structure and may have the vacuum pumps 13 and 15 mounted thereunder. The Pirani gauge 19 may be fastened to the panel of the table as is the Dubrovin gauge 31. The temperature gauge 64 may be conveniently placed upon the table top 69. The tubing of the vacuum manifold and of the inert gas manifold may be fastened to the table and to the panel respectively by means of vitreous supporting elements 71 which are fastened in a conventional means to the table and panel.

The operation of the apparatus is as follows:

The letters are welded to the letter manifold and the letter manifold is mounted in the oven and welded to the vacuum manifold and to the mercury reservoir. The oven door is then closed and the heating elements turned on. The vacuum pumps are put into operation and the stop cock 12 to the vacuum manifold is opened, the vacuum in the manifold being constantly checked with the Pirani gauge which should register approximately 1.0 micron in approximately 22 minutes. By this time the oven, letters, and letter manifold therein have reached a maximum temperature and the vacuum stop cock 12 and heating elements are turned off. The inert gases are then connected to the letters by opening stock cock 22 and the appropriate stop cocks 27, 28 and 29, and the stop cock 62 is thereafter closed to isolate the letter manifold from the vacuum system.

The life of the letters produced is to a large degree dependent upon the use of the proper vacuum and gas pressures in the filing of the letters. It has been found that for each diameter of tubing of which the letters are formed, there is a critical gas pressure which will bring about a maximum letter life while any substantial deviation from this pressure will result in letters having shortened service lives. It has been discovered that the diameter of the letter tubes in millimeters is related to the critical gas pressure in millimeters of mercury by the following emphirical equation: $P=308/D^{1.89}$ where P is the pressure and D is the inside diameter of the letter tubes. This relationship is shown in graphic form in Figure 5. Tubes of the following sizes were tested and the optimum gas pressures found to have the following values:

| | mm. pressure |
|---|---|
| 10 mm. tubing | 40 |
| 12 mm. tubing | 28 |
| 15 mm. tubing | 18–20 |
| 18 mm. tubing | 12–14 |
| 25 mm. tubing | 7 |

While the foregoing pressures are subject to a variation of 10 to 15% without an unduly marked decrease in tube life any substantial variation therefrom will result in a very material decrease in service life of the letters.

After the gas system has been isolated from the letter manifold by means of stop cock 62 the electric heating coil around the mercury bulb 54 is energized and the mercury quickly brought to a boil causing it to evaporate into the letter manifold which is still hot enough to vaporize the mercury. The stop cock 62 holds the mercury vapor in the letter manifold and when the letter manifold has cooled sufficiently to condense the mercury a hand torch is used to seal the letter manifold off from the vacuum system and the letters are then removed. It will be readily appreciated that while the description has for simplicity purposes been directed to the operation of but one oven, a plurality of ovens might simultaneously be operated in the same manner. The resulting electrodeless letters are thus produced in a very economic fashion and because of the critical vacuum and gas pressures used will possess an extremely long service life.

Whereas this invention has been described in terms of specific apparatus and process steps, it is to be understood that this has been for purposes of illustration only and is not to be deemed limiting in any sense, the invention being limited solely by the terms and spirit of the appended claims.

I claim:

1. In a method of manufacturing gaseous discharge letters, the steps comprising, connecting a plurality of said letters to a manifold, placing said letters and manifold in an oven having a heating means, energizing said heating means to heat said letters and manifold, evacuating said letters and manifold to a vacuum of the order of 1 micron, deenergizing said heating means, supplying at least one inert gas to said letters at a pressure of the order of $P=308/D^{1.89}$ where P is pressure in millimeters of mercury and D is the inside diameter of the letter tubing in millimeters, introducing mercury vapor into said letters, cooling said letters to condense said mercury therein, sealing said letters, and removing said letters from said manifold.

2. In an apparatus for processing gaseous discharge letters including a vacuum manifold and a mercury reservoir, the combination comprising, an insulated container, a main manifold tube supported in said container, a plurality of T tubes connected to said main tube at regular intervals therealong, gaseous discharge letters connected to said T tubes, a connector tube connecting said main tube with said vacuum manifold, and a tube connecting said main tube with said mercury reservoir outside of said container.

3. In an apparatus for processing gaseous discharge letters including a vacuum manifold and a mercury reservoir, the combination comprising, an insulated container having heating means, a letter manifold support in said container, a main manifold tube located in said container parallel to the bottom thereof and supported on said manifold support, a plurality of T tubes having cross bars and stems arranged along said manifold tube, said stems being connected to said manifold tube at regular intervals, said cross bars lying in a common plane and said stems lying in a common plane, gaseous discharge letters connected to the extremities of said cross bars, a connector tube connecting said manifold tube with said vacuum manifold, and a tube connecting said manifold tube with said mercury reservoir outside of said container.

4. A device as set out in claim 3 wherein the stems of said T tubes are substantially vertical and the cross bars of said T tubes are substantially horizontal.

5. A device as set out in claim 4 wherein said letter manifold support comprises a pair of triangular elements notched at the apex.

6. A device as set out in claim 5 wherein the heating means comprises a plurality of separately energizable resistance wire circuits and the resistance wire is arranged substantially parallel to the manifold tube.

7. An oven for processing gaseous discharge tubes comprising in combination, a container having double walls and heat insulating material therebetween, a letter manifold support in said container comprising a pair of triangular elements notched at the apex, main manifold tube supported on said elements in said notches parallel to the bottom of said container, a plurality of separately energizable resistance wire circuits supported by said triangular elements parallel to said manifold tube, a plurality of T tubes having cross bars and stems arranged along said manifold tube, said stems lying in a substantially vertical plane and being connected to said manifold tube at regular intervals therealong, the cross bars of said T tubes being substantially horizontal and lying in a common plane, and a pair of connector tubes connected to said manifold tube at its extremities and extending out of said container.

References Cited in the file of this patent

UNITED STATES PATENTS

| | | |
|---|---|---|
| 441,127 | Bornholdt | Nov. 25, 1890 |
| 1,298,569 | Le Rossignol | Mar. 25, 1919 |
| 1,503,614 | Travers | Aug. 5, 1924 |
| 1,551,527 | Pirani | Aug. 25, 1925 |
| 1,727,458 | Varcoe | Sept. 10, 1929 |
| 2,097,307 | Ruggles | Oct. 26, 1937 |
| 2,223,031 | Edwards | Nov. 26, 1940 |
| 2,235,510 | Watrous | Mar. 18, 1941 |
| 2,481,042 | Tomasek et al. | Sept. 6, 1949 |
| 2,606,536 | Hess et al. | Aug. 12, 1952 |

FOREIGN PATENTS

| | | |
|---|---|---|
| 107,400 | Australia | May 10, 1939 |